Nov. 18, 1924.

H. SMITH

HAND STOOKING HOOK

Filed May 23 1921

1,515,975

INVENTOR
HENRY SMITH.
BY Fetherstonhaugh Co'y
ATTYS.

Patented Nov. 18, 1924.

1,515,975

UNITED STATES PATENT OFFICE.

HENRY SMITH, OF MOOSE JAW, SASKATCHEWAN, CANADA.

HAND STOOKING HOOK.

Application filed May 23, 1921. Serial No. 472,028.

*To all whom it may concern:*

Be it known that I, HENRY SMITH, a subject of the King of Great Britain, residing at the city of Moose Jaw, in the Province of Saskatchewan and Dominion of Canada, have invented certain new and useful Improvements in Hand Stooking Hooks, of which the following is a specification.

This invention relates to improvements in hand stooking hooks, and the objects of the invention are to provide a simple and effective device to assist a man in the grain field to lift the sheaves that are dropped from the binder on to the ground and to place them in the form of a stook.

Further objects of the invention are to provide such a device as will enable the operator to pick up and handle the sheaves without stooping and which will save his steps by enabling him to gather sheaves from a considerable distance and deposit them in the form of a stook.

Further objects of the invention are to enable the sheaves to be handled in a more gentle manner so that the grain is not shaken out of the head and there is less likelihood of the bundles coming apart as they frequently do when handled by hand.

Further objects of the invention are generally to improve and simplify the construction of the device to enable it to effectually perform the functions required of it. It consists essentially of the improved construction hereinafter described in detail in the accompanying specification and drawings.

In the drawings.

In the drawings, like characters of reference indicate corresponding parts in all the figures.

Referring to the drawings:—

Figure 1:
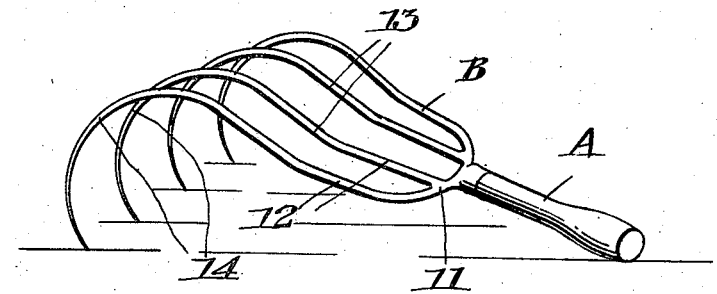
Figure 1 is a perspective view of an embodiment of the invention.
Figure 2:
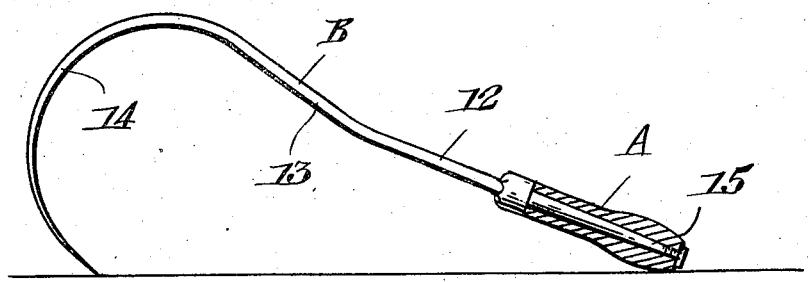
Figure 2 is a side elevation.
Figure 3:
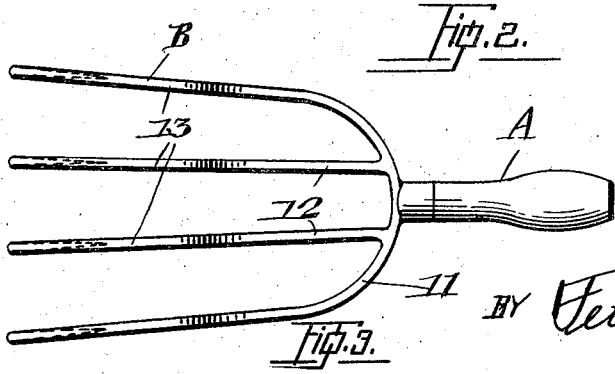
Figure 3 is a plan view on a reduced scale.

A indicates a handle and B a gathering fork suitably attached to the handle and comprising a plurality of substantially parallel hook shaped tines connected at the innermost end by a curved connecting member 11 which is suitably connected to the handle and being gradually tapered to a point at their outer ends. Each tine is formed with a portion 12 extending substantially in alignment with the handle A and with an inclined portion 13 set at a slight angle to the portion 12 and with a semi-circular portion 14 which joins the portion 13.

The tines are gradually separated laterally from each other. Thus, while the extreme width between the two outside tines at their points may be approximately nine and one-quarter inches, the width at the point where the tines join the curved portion might be approximately seven and one-half inches. It is found that by this arrangement of tines and the curvature thereof it is possible to lift the sheaf with maximum facility and deposit it at the place of formation of the shook.

As many changes could be made in the above construction and many widely different embodiments of my invention within the scope of the claims, constructed without departing from the spirit or scope thereof, it is intended that all matter contained in the accompanying specification and drawings shall be interpreted as illustrative and not in a limiting sense.

The fork is attached to the handle by a tapered extension 15 extending therethrough and riveted to the handle.

What I claim as my invention is:—

A stooking hook comprising a handle, a plurality of hook-shaped tines connected thereto, spaced from each other and formed with an inner portion in the same plane as the handle, an intermediate portion inclined upwardly from the inner portion, an outer portion semi-circular in shape, the outer ends being tapered to a point substantially parallel to the inclined portion whereby a sheaf carrying pocket is formed.

In witness whereof I have hereunto set my hand in the presence of two witnesses.

HENRY SMITH.

Witnesses:
 A. D. GRAYSON,
 D. MUNGWOOD.